(12) United States Patent
Adra et al.

(10) Patent No.: US 10,110,080 B2
(45) Date of Patent: Oct. 23, 2018

(54) COIL AND STATOR ASSEMBLY OF A ROTARY ELECTRIC MACHINE

(71) Applicant: Caterpillar Inc., Peoria, IL (US)

(72) Inventors: Rodwan T. Adra, Peoria, IL (US);
David A. Gleissner, Metamora, IL (US); Frederick Glueck, Peoria, IL (US); Jeffrey T. Michielutti, Peoria, IL (US); Ralph E. Boirum, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 379 days.

(21) Appl. No.: 14/954,372

(22) Filed: Nov. 30, 2015

(65) Prior Publication Data
US 2017/0155295 A1  Jun. 1, 2017

(51) Int. Cl.
*H02K 3/18*   (2006.01)
*H02K 15/04*  (2006.01)

(52) U.S. Cl.
CPC .............. *H02K 3/18* (2013.01); *H02K 15/045* (2013.01)

(58) Field of Classification Search
CPC ........................................................ H02K 3/18
See application file for complete search history.

(56) References Cited

U.S. PATENT DOCUMENTS

| | | | | |
|---|---|---|---|---|
| 2,328,470 A * | 8/1943 | Lange | ...................... | H02K 3/18 310/194 |
| 2,565,128 A * | 8/1951 | Hanna | ...................... | H02K 3/18 310/180 |
| 2,655,613 A * | 10/1953 | Wieseman | ............... | H02K 3/18 310/191 |
| 4,794,361 A * | 12/1988 | Young | ................. | H01F 27/2823 242/430 |
| 4,831,303 A | 5/1989 | Rowe et al. | | |
| 4,967,464 A * | 11/1990 | Stephens | .................. | H02K 3/18 29/596 |
| 5,285,563 A * | 2/1994 | Nove | ..................... | H02K 3/522 166/402 |
| 6,011,339 A * | 1/2000 | Kawakami | ............. | H02K 1/278 310/208 |
| 7,872,559 B2 * | 1/2011 | Asano | ....................... | H01F 5/02 242/347 |
| 9,118,225 B2 * | 8/2015 | Adra | ....................... | H02K 3/18 |

(Continued)

FOREIGN PATENT DOCUMENTS

| | | |
|---|---|---|
| CN | 103516088 | 1/2014 |
| JP | 2002171704 | 6/2002 |
| JP | 2011135640 | 7/2011 |

OTHER PUBLICATIONS

U.S. Appl. No. 14/585,878, filed Dec. 30, 2014.

*Primary Examiner* — Robert W Horn
(74) *Attorney, Agent, or Firm* — Leydig, Voit & Mayer, Ltd.

(57) ABSTRACT

A coil for a rotary electric machine includes a plurality of electrically conductive wires defining a group of wires wrapped to define a plurality of turns. The coil further includes a pair of major sections and a compound outer surface along the pair of major sections. The compound outer surface has a first leg section and a second leg section with the first leg section and the second leg section at an angle to each other. A bonding material is positioned along portions of the pair of major sections to define the compound outer surface.

19 Claims, 6 Drawing Sheets

(56) References Cited

U.S. PATENT DOCUMENTS

| | | | |
|---|---|---|---|
| 9,806,573 B2* | 10/2017 | Kato | H02K 3/12 |
| 2003/0071534 A1 | 4/2003 | Kreuzer et al. | |
| 2006/0033395 A1* | 2/2006 | Izumi | H02K 3/18 |
| | | | 310/208 |
| 2006/0196041 A1 | 9/2006 | Hansen | |
| 2007/0145856 A1 | 6/2007 | Hirzel et al. | |
| 2011/0025164 A1 | 2/2011 | Tanaka et al. | |
| 2013/0113332 A1 | 5/2013 | Saito | |
| 2013/0276296 A1* | 10/2013 | Tanahashi | H02K 1/146 |
| | | | 29/596 |
| 2014/0333171 A1* | 11/2014 | Lange | H02K 3/18 |
| | | | 310/208 |
| 2015/0188371 A1* | 7/2015 | Kato | H02K 3/18 |
| | | | 310/208 |
| 2016/0028295 A1* | 1/2016 | Hashimoto | H02K 15/066 |
| | | | 29/596 |
| 2016/0233729 A1* | 8/2016 | Lambert | H02K 1/146 |
| 2016/0329793 A1* | 11/2016 | Li | H02K 1/2786 |
| 2016/0344270 A1* | 11/2016 | Katsuragi | H02K 1/148 |
| 2016/0365758 A1* | 12/2016 | Nonaka | H02K 3/18 |
| 2016/0372984 A1* | 12/2016 | Parker | H02K 3/18 |
| 2017/0155295 A1* | 6/2017 | Adra | H02K 3/18 |
| 2017/0163113 A1* | 6/2017 | Sakaguchi | H02K 3/18 |

* cited by examiner

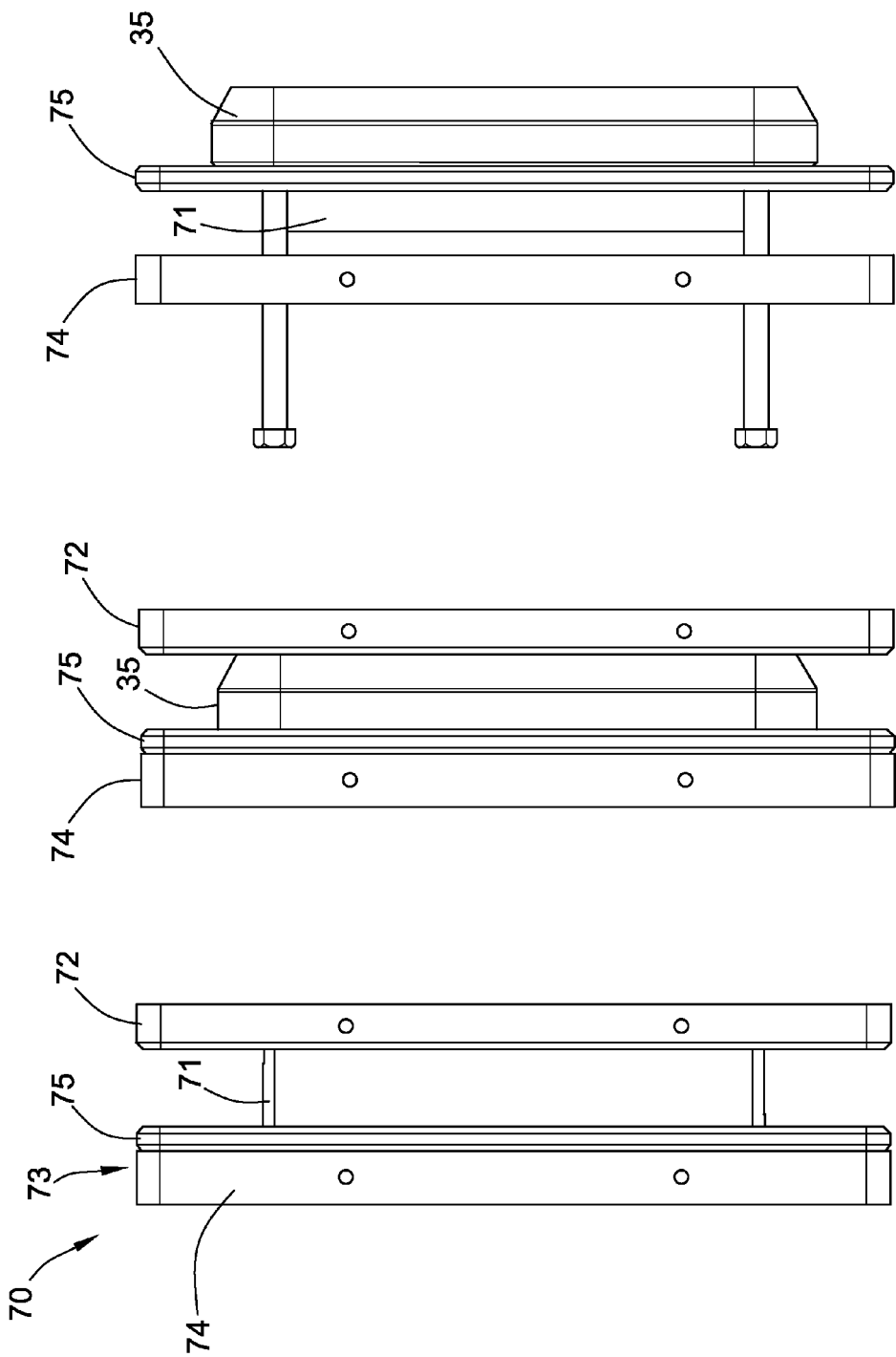

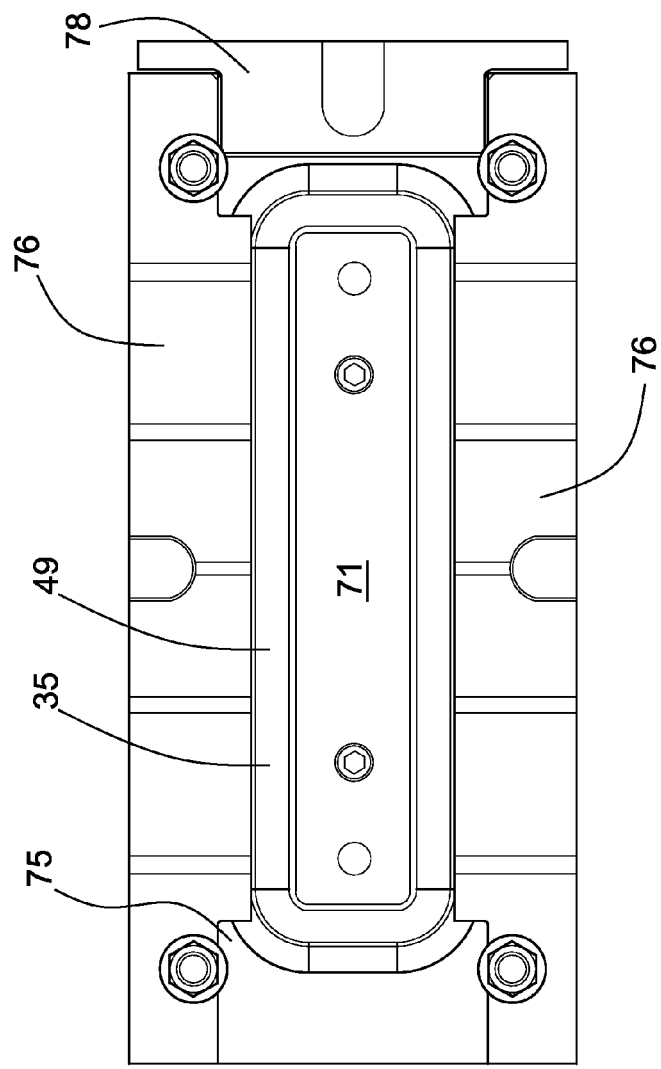
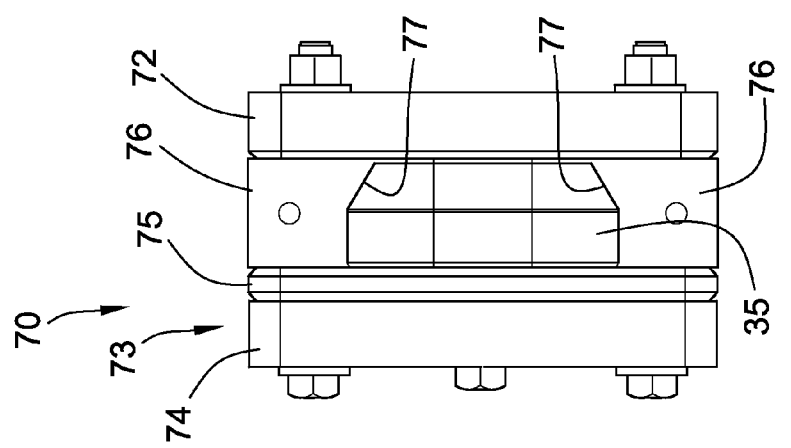
FIG. 7
FIG. 8

COIL AND STATOR ASSEMBLY OF A ROTARY ELECTRIC MACHINE

TECHNICAL FIELD

This disclosure relates generally to a rotary electric machine and, more particularly, to a coil and stator assembly of a rotary electric machine and a method of fabricating a coil and stator assembly.

BACKGROUND

Work machines may be powered by electrical propulsion systems. The electrical propulsion systems sometimes include electric drive traction systems that provide driving forces to traction devices of the work machines. In some electric drive fraction systems, switched reluctance motors are used to provide the driving force.

Switched reluctance motors may have various motor topologies (e.g., the number of stator poles, the number of coils, and the number of rotor poles). In addition, a switched reluctance motor may be configured with a plurality of phases (e.g., 2 phases, 3 phases, 4 phases, or more). A switched reluctance motor may have a plurality of stator poles, each with a winding of electrically conductive wires or coil positioned therearound. The number of wires and the configuration of the coil is one factor that affects the efficiency of the operation of the switched reluctance motor.

Many switched reluctance motors are designed to optimize operation under certain operating conditions. However, it is desirable for switched reluctance motors used to power certain work machines to operate efficiently at both low speeds with high current and at higher speeds with lower current. The coils of some motors perform well electrically but lack the ability to carry significant amounts of current without excessive coil heating. Other coils have increased current carrying capacity but do not perform efficiently as operating frequencies increase, which also limits their ability to power work machines.

U.S. Pat. No. 9,118,225 discloses a switched reluctance motor having a plurality of coils with each coil mounted on a stator pole. The coils are formed with wires that are loosely twisted so that they are movable as they are mounted on the stator poles. The movement of the wires during the mounting process results in improved electrical performance of the motor.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a coil for a rotary electric machine includes a plurality of electrically conductive wires defining a group of wires with the group of wires being wrapped to define a plurality of turns of the group of wires. The coil further includes a pair of major sections and a pair of minor sections with each minor section interconnecting the pair of major sections. The coil further includes an inner surface, a compound outer surface along the pair of major sections, an insertion end configured to be positioned generally adjacent a stator body of the rotary electric machine, and a rotor end positioned opposite the insertion end. The insertion end and the rotor end interconnect the inner surface to the compound outer surface. The compound outer surface has a first leg section and a second leg section with the first leg section extending generally from the insertion end towards the rotor end and the second leg section extending from the rotor end generally towards the first leg section. The first leg section and the second leg section are at an angle to each other. A bonding material is positioned along portions of the pair of major sections to define the compound outer surface.

In another aspect, a method of fabricating a coil for a rotary electric machine includes providing a fixture having a core, supplying a plurality of electrically conductive wires to define a group of wires and wrapping the group of wires a predetermined number of turns around the core of the fixture to form a coil having a pair of major sections and a pair of minor sections with each minor section interconnecting the pair of major sections. The coil further includes an inner surface, an outer surface, an insertion end, and a rotor end positioned opposite the insertion end, with the insertion end and the rotor end interconnecting the inner surface to the outer surface. Each of the plurality of electrically conductive wires of each turn is laterally movable relative to others of the plurality of electrically conductive wires of the turn along at least a portion thereof. The method also includes moving an insert along the outer surface of the pair of major sections to laterally move at least some of the plurality of electrically conductive wires of each turn to reduce uniform voids between the plurality of electrically conductive wires and to form a compound outer surface along the pair of major sections with the compound outer surface having a first leg section and a second leg section. The first leg section extends generally from the insertion end towards the rotor end, the second leg section extends from the rotor end generally towards the first leg section, and the first leg section and the second leg section are at an angle to each other. A bonding material is applied along portions of the pair of major sections to define the compound outer surface.

In still another aspect, a rotary electric machine includes a stator having stator body with an open slot configuration and a plurality of stator poles extending away from the stator body to define a plurality of stator slots. Each stator slot is positioned between a pair of the plurality of stator poles. A rotor is positioned within the stator and has a plurality of rotor poles. A coil is positioned about each stator pole with each coil having a plurality of electrically conductive wires defining a group of wires and the group of wires being wrapped around its respective stator pole to define a plurality of turns of the group of wires about the stator pole. Each coil has a pair of major sections and a pair of minor sections with each minor section interconnecting the pair of major sections. The coil further includes an inner surface, a compound outer surface along the pair of major sections, an insertion end configured to be positioned generally adjacent a stator body of the rotary electric machine, and a rotor end positioned opposite the insertion end. The insertion end and the rotor end interconnect the inner surface to the compound outer surface. The compound outer surface has a first leg section and a second leg section with the first leg section extending generally from the insertion end towards the rotor end and the second leg section extending from the rotor end generally towards the first leg section. The first leg section and the second leg section are at an angle to each other. A bonding material is positioned along portions of the pair of major sections of each coil to define the compound outer surface of the coil.

BRIEF DESCRIPTION OF THE DRAWINGS

FIG. 4 is an end view of a portion of a fixture for winding the coil of FIG. 2;

FIG. 5 is an end view of the portion of the fixture of FIG. 4 with a coil formed thereon;

FIG. 6 is an end view of a portion of the fixture and coil of FIG. 5 with the push plate pushing the coil from the fixture;

FIG. 7 is a front view of a portion of the fixture and coil with the inserts mounted thereon;

FIG. 8 is an end view of FIG. 7 but with the first flange plate mounted thereon.

DETAILED DESCRIPTION

Figure 1:
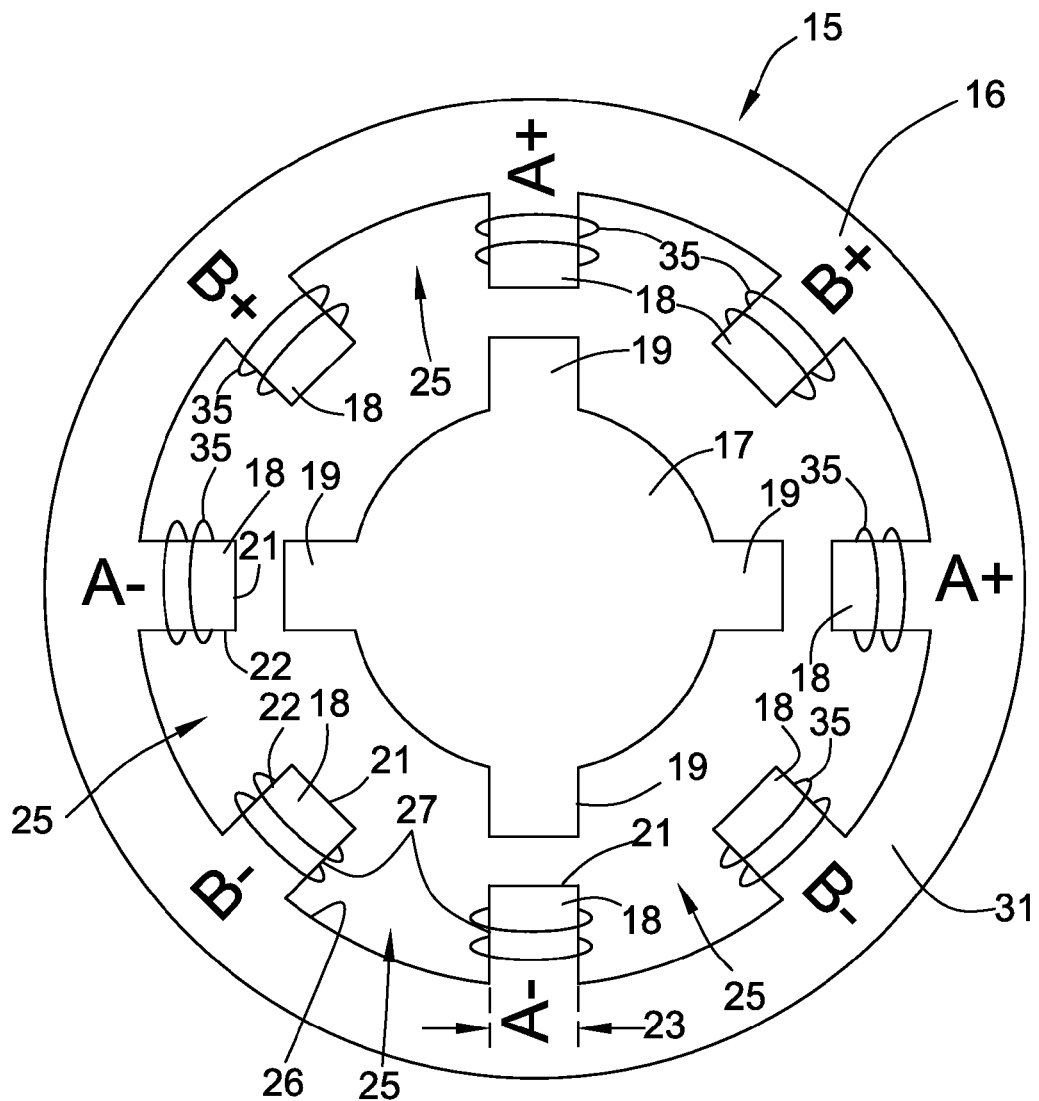
FIG. 1 is a diagrammatic top view of a portion of a switched reluctance motor incorporating certain aspects of the disclosure therein.

FIG. 1 depicts a schematic view of a rotary electric machine such as a switched reluctance motor 15 that includes a stator 16 and a rotor 17 that is rotatable relative to the stator. As depicted, stator 16 includes eight radially inwardly projecting stator poles 18 and rotor 17 includes four radially outwardly projecting rotor poles 19. The number of phases of the motor as well as the number of stator poles 18 and rotor poles 19 is exemplary only and not intended to be limiting. Each stator pole 18 projects radially inward and has an inward end face 21 and a pair of oppositely facing side surfaces 22. The distance, indicated at 23, between the oppositely facing side surfaces 22 (i.e., a first side surface and a second side surface of the stator pole 18) is generally constant so that each pole has a generally constant width in a circumferential direction around the stator 16.

Stator 16 further includes a plurality of stator slots 25 with each stator slot being angularly positioned between a pair of the stator poles 18 and thus each stator pole 18 is angularly positioned between a pair of adjacent stator slots 25. Accordingly, the number of stator slots 25 is equal in number to the number of stator poles 18. Each stator slot 25 opens towards rotor 17 and has an edge or outer surface 26 and opposed side edges 27 defined by the oppositely facing side surfaces 22 of adjacent stator poles 18.

Due to the circular cross-section of the stator 16 and the generally constant width of each stator pole 18 in an arcuate or circumferential direction, each stator slot 25 has a width that tapers or narrows generally uniformly or linearly from the outer surface 26 towards the opening 29. With such a structure, the stator 16 may be referred to as having an open slot configuration. A centerline of each stator slot 25 extends between adjacent pairs of stator poles to define the midpoint between the opposed side edges 27 of the stator slot.

Each stator pole 18 has a conductive winding or coil 35 wrapped therearound. The coils 35 positioned about the stator poles 18 of each group of a phase set (A+, A− and B+, B−) are electrically connected and may be configured as part of an electrical circuit, either in parallel or in series.

Switched reluctance motor 15 has a rotor 17 with no windings or magnets. The rotor 17 may be formed of a stack of vertically laminated iron, one-piece continuous annular members (not shown). Rotors 17 having other structures and configurations are contemplated. In addition, while the motor of FIG. 2 is depicted as a switched reluctance motor, the concepts disclosed herein are applicable to other rotary electric machines such as a switched reluctance generator or one in which the rotor 17 has permanent magnets or some other structure or configuration.

Figure 2:
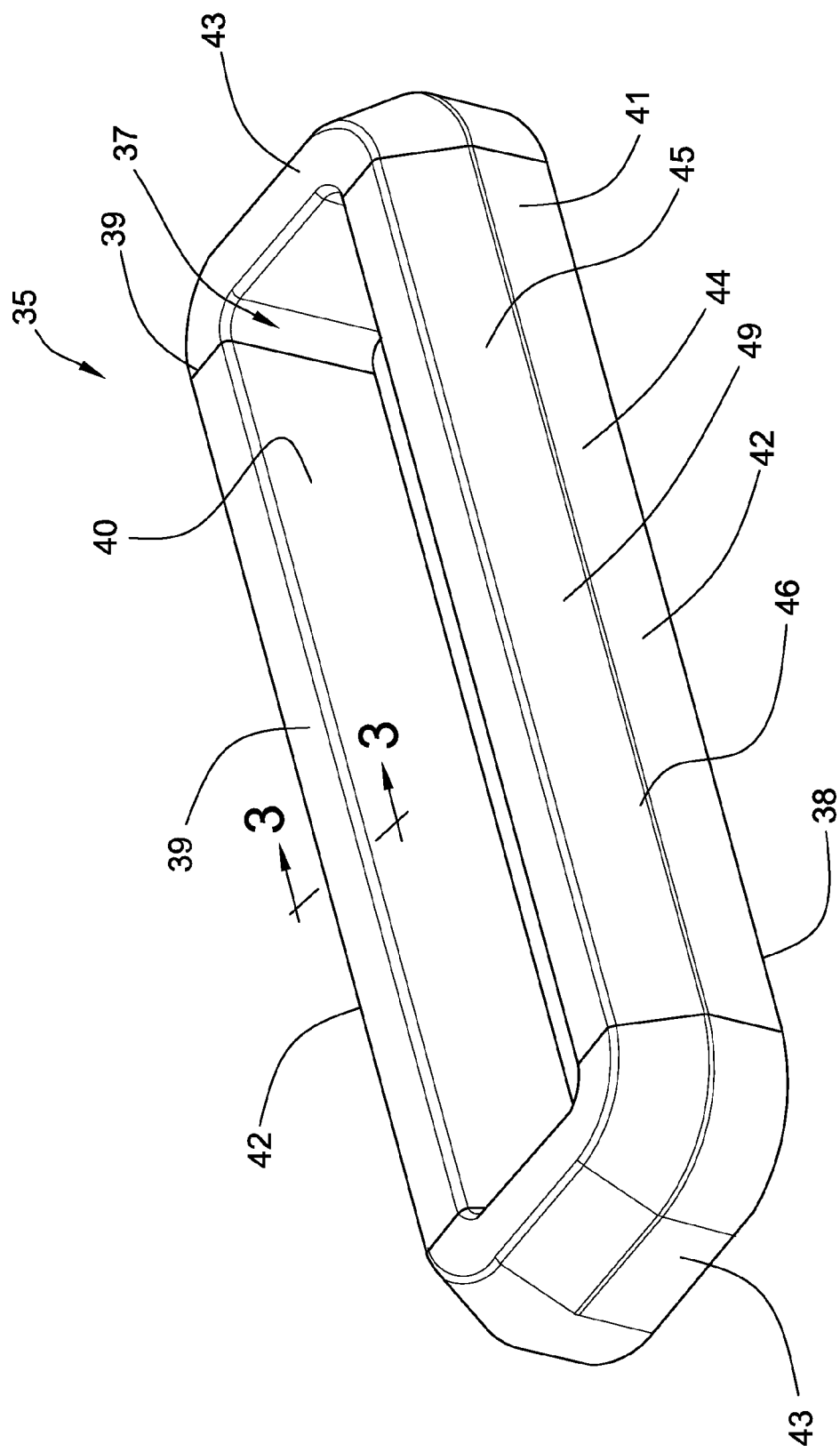
FIG. 2 is a perspective view of a coil used with the switched reluctance motor of FIG. 1.
Figure 3:
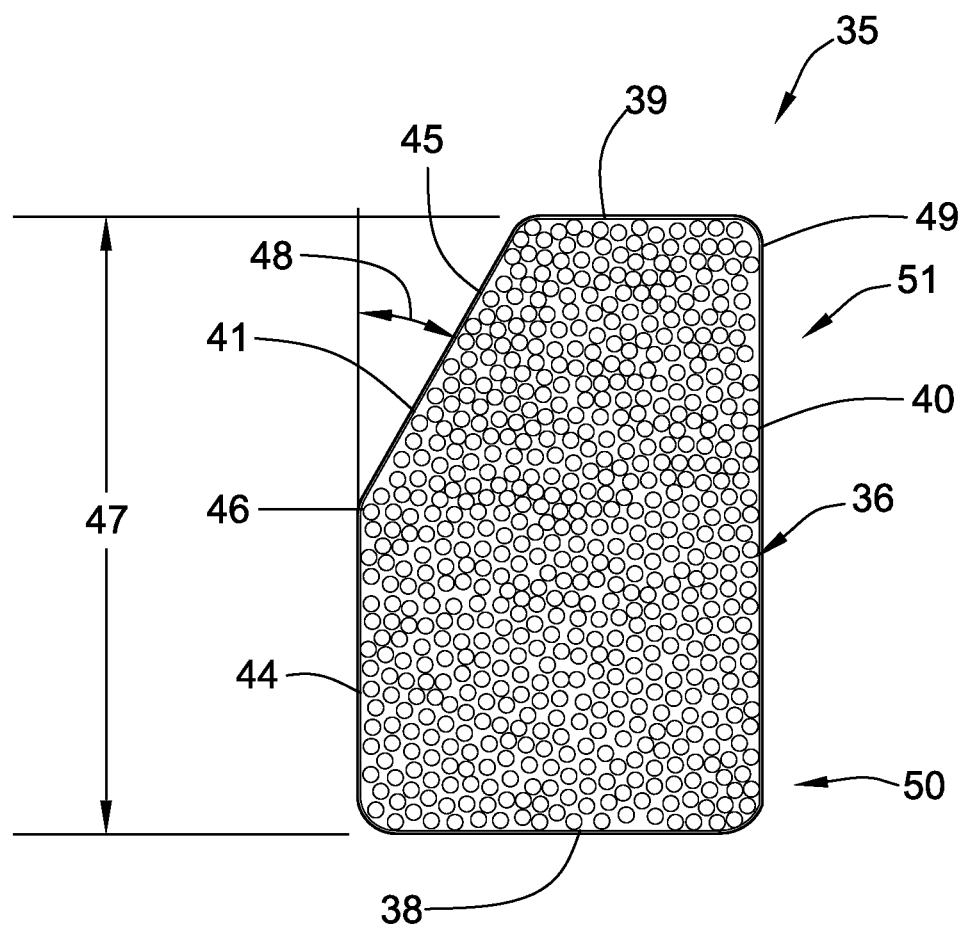
FIG. 3 is section of the coil of FIG. 2 taken generally along line 3-3.
Figure 9:
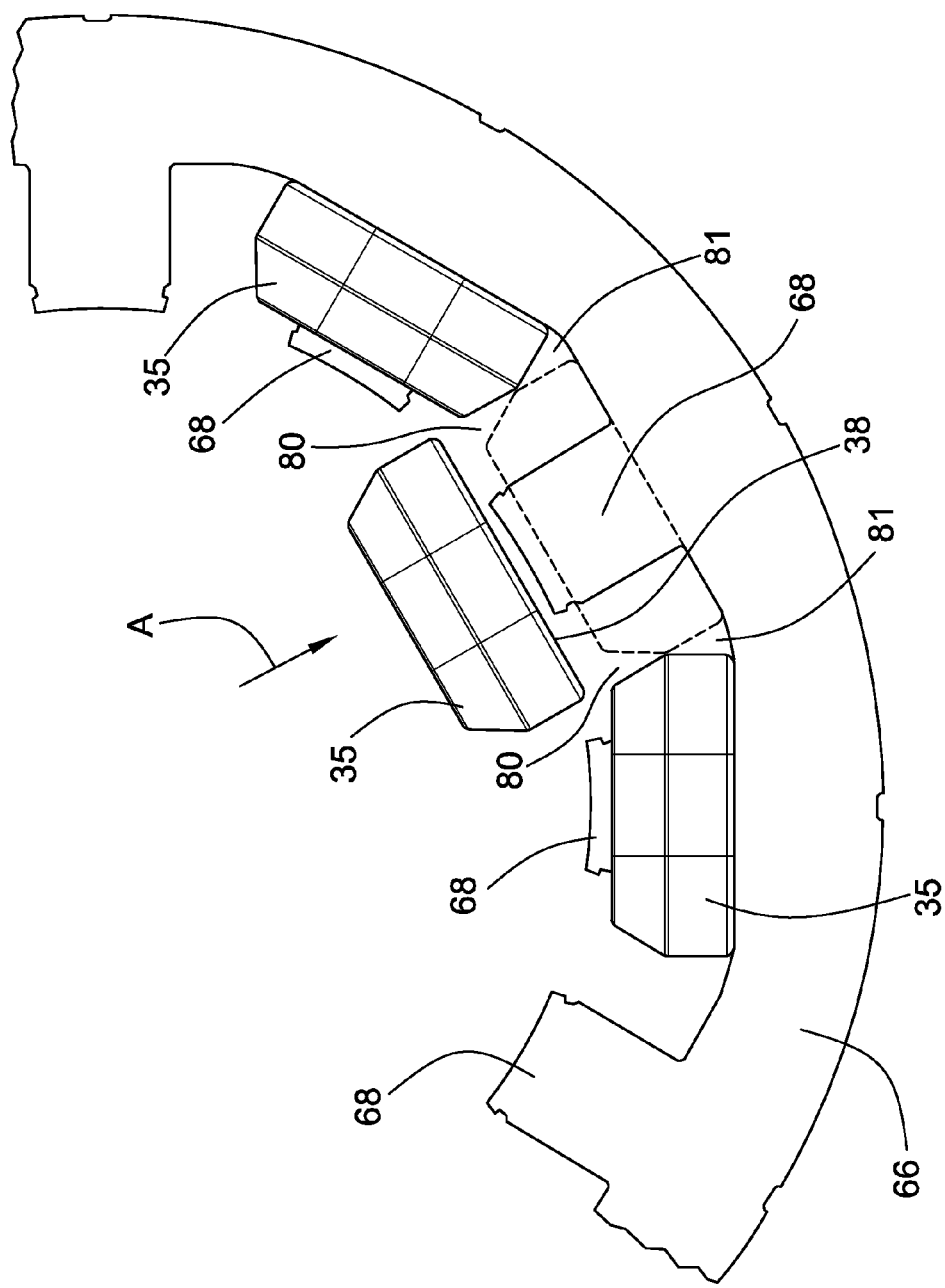
FIG. 9 is fragmented, enlarged view of a portion of a stator with coils mounted on some of the stator poles.

Referring to FIGS. 2-3, coil 35 may be formed of a plurality of electrically conductive wires 36 that define a group of wires that are wrapped in a generally oval manner around the central opening 37 a predetermined number of times or turns. The central opening 37 generally corresponds in size to the cross section of the stator poles 18 so that the coil 35 may be slid onto the stator pole 18 during the fabrication of the switched reluctance motor 15 (FIG. 9). Each coil 35 includes an insertion end 38 to be positioned generally adjacent the stator body 31 of the stator 16, and a rotor end 39 to be positioned opposite the insertion end and generally adjacent the end face 21 of the stator pole 18 and is generally opposed to the rotor 17. An inner surface 40 is configured to be positioned adjacent or in proximity to its respective stator pole 18 and a compound outer surface 41 generally faces opposite the inner surface. Accordingly, both the inner surface 40 and the outer surface 41 define generally oval surfaces. The insertion end 38 and the rotor end 39 interconnect the inner surface 40 to the outer surface 41.

Each coil 35 has a pair of major sections 42 and a pair of minor sections 43, with each minor section interconnecting the pair of major sections. The compound outer surface 41 along the pair of major sections 42 includes a first leg section 44 and a second leg section 45. The first leg section 44 extends from the insertion end 38 of the coil 35 towards the rotor end 39. The second leg section 45 extends from the rotor end 39 towards the insertion end 38 and intersects with the first leg section 44 at intersection 46.

As depicted, the position of the intersection 46 relative to the insertion end 38 and the rotor end 39 is approximately 54% of the height 47 of the outer surface 41. Other proportions may be used as desired. In one embodiment, it is believed that positioning the intersection 46 at a location between approximately 49% and 59% of the height 47 will yield acceptable results. In another embodiment, positioning the intersection 46 at a location between approximately 44% and 64% of the height 47 may yield acceptable results.

The first leg section 44 and the second leg section 45 are positioned or configured at an angle 48 to each other at intersection 46. Accordingly, the first leg section 44 defines a first section 50 having a generally uniform width (i.e., the distance from the inner surface 40 to the outer surface 41). The second leg section 45 defines a second section 51 having a tapering width. The angle 48 may be based or dependent upon or the number of stator poles 18 of stator 16. In one embodiment, the angle 48 may be generally equal to 360 degrees divided by the number of stator poles 18. The coil 35 depicted in FIGS. 2-3 may be used with a stator 66 (FIG. 9) having twelve stator poles 68 and thus the angle 48 is configured as approximately 30 degrees. In many applications, the angle 48 may be between approximately 15 degrees and 60 degrees.

Although depicted in the drawings with the compound outer surface 41 extending around the entire outer surface of the coil 35, in some configurations only the major sections 42 may include the compound outer surface 41.

While depicted as having a continuous, solid outer surface 41, coil 35 is formed of a plurality of a electrically conductive wires 36 as seen in FIG. 3 and may or may not have such a continuous solid surface. However, as discussed in more detail below, portions of the plurality of electrically conductive wires 36 may be secured together along the major sections 42 of the coil 35 with a bonding material to maintain the portions of the plurality of electrically conductive wires in their desired positions and define the compound outer surface 41.

If desired, a heat resistant, electrically insulating layer or wrap 49 may be applied to the outer surface 41 of coil 35 along the major sections 42. In one example, the insulating wrap 49 may be a material such as Nomex® or one with similar properties.

As depicted in FIG. 3, each electrically conductive wire 36 has a generally circular cross-section. The electrically conductive wires 36 may have a non-circular cross-section such as oval, square or rectangular in some configurations. The electrically conductive wires 36 may be formed of a highly conductive, flexible material, such as copper, and have a layer of insulation thereon. In one embodiment, magnet wires having a layer of enamel insulation may be used.

In one embodiment, a coil 35 may be fabricated with a pair of major sections 42 of approximately eight inches in length and a pair of minor sections 43 of approximately two inches in length. The group of wires may include seven electrically conductive wires 36, each having a diameter of approximately 0.05 inches, and may be wrapped around the central opening 37 fifty-six times. Such a coil may also be referred to as having fifty-six turns. In other similar embodiments, the group of wires may include between approximately five and nine electrically conductive wires 36. Other numbers of electrically conductive wires 36 may be used if desired.

The electrically conductive wires 36 may also have other diameters. In another embodiment, the electrically conductive wires 36 may be approximately 15-18 gauge wire. Other numbers of electrically conductive wires 36 and those having other diameters may also be used. The number of turns or times that the group of wires is wrapped around the central opening 37 may be determined or set based upon the desired electrical performance of the switched reluctance motor 15. Accordingly, the number of turns about the central opening 37 may be adjusted as desired.

The group of wires that is wrapped around the central opening 37 is formed of individual electrically conductive wires 36 that may also be twisted together. The twisting of the wires may be achieved in any desired manner. In one example, the electrically conductive wires 36 may be fed from a plurality of wire supplies (not shown) through a tensioner (not shown) and the tensioner (as well as the wire supplies, if desired) may be rotated to twist the wires as they are being fed and wrapped around a bobbin assembly or fixture 70 (FIG. 4) to form the coil 35.

Regardless of the manner of twisting the electrically conductive wires 36, the twist forms a relatively loose twist of the wires. Such a loose twist of wires permits the individual electrically conductive wires 36 to move laterally relative to the other wires as the coil 35 is formed.

To form a coil 35, the plurality of electrically conductive wires 36 may be wrapped around a fully assembled bobbin assembly or fixture 70. Fixture 70 includes a central oval shaped core 71 positioned between a first flange plate 72 and a second flange assembly 73. The first flange plate 72 may be removably mounted relative to the core 71. The second flange assembly 73 includes a second flange plate 74 and a push plate 75. The core 71 may be fixed to the second flange plate 74 and the push plate 75 may be slidably mounted on the second flange plate 74 and have an opening corresponding to the size of the core 71. Referring to FIG. 6, the push plate 75 may have an opening (not shown) corresponding in shape to core 71 and the plate may be slidably movable away from the second flange plate 74 with the opening moving past the core 71 to discharge a completed coil 35 from the fixture 70.

During assembly of a coil, a length of the insulating wrap 49 may be positioned along the long or major sides of core 71 and the wires 36 wrapped around a portion of the insulating wrap and the core. If the wires 36 are to be twisted, they may be twisted as they are wrapped around the core 71. Such twisting may cause the group of wires to take on a somewhat circular cross-section but the loose twist of the wires permits lateral movement of each electrically conductive wire 36 relative to other wires within the group of wires. In some embodiments, the electrically conductive wires 36 may be twisted between approximately one and five times as they are wrapped about the core 71. In other embodiments, it may be possible to twist the group of wires at a slower or a faster rate or not at all. In some embodiments, the groups of wires are twisted in a generally uniform manner along the entire length of each turn. In other embodiments, the groups of wires may not be twisted in a generally uniform manner. For example, the wires may be twisted in one manner along the major sections 42 and in a different manner (e.g., at a different rate or not at all) along the minor sections 43.

As the plurality of electrically conductive wires 36 are wrapped around fixture 70, a bonding material may be applied to the wires. The bonding material may be any desired material including epoxies, silicones, rubber based adhesives, and polyester based materials. The bonding material may exhibit high thermal conductivity properties, if desired. In some instances, it may be desirable to wrap or wind the wires 36 around the core 71 in a pattern that generally matches the desired shape or cross section of the coil 35. For example, referring to FIG. 3, the wires 36 may be wound generally in a pattern to approximate the shape of the coil along the first leg section 44 and the second leg section 45 of outer surface 41.

In an alternate embodiment, the bonding material may be applied to the electrically conductive wires 36 after they have been wound around the core 71. In such case, it may be possible to only apply the bonding material along the major sections 42 of the coil 35. In addition, it may not be necessary to apply the bonding material to or along all of the wires 36. For example, it may be possible to apply the bonding material only along all or portions of the inner surface 40 and the outer surface 41. In some instances, the bonding material may be applied to all or portions of the insertion end 38 and the rotor end 39 or may be omitted from all or portions thereof.

Once the wires 36 are wound around the core 71 of the fixture 70, portions of the length of insulating material 49 may be folded or positioned over the insertion end 38, the rotor end 39, and the outer surface 41 along the major sections of the coil. Inserts 76 are then (FIGS. 7-8) positioned or mounted along the major sections 42 of the coil 35 to engage the electrically conductive wires 36 and force them into a desired shape. More specifically, the inserts 76 each have an inner surface 77 that corresponds in shape to the desired shape of outer surface 41. Since the wires 36 are wrapped (and possibly twisted) around the core 71 in a relatively loose manner to permit movement of the wires, pushing the inserts 76 towards the core 71 of fixture 70 may cause sufficient lateral movement of the wires so that so that each turn or wrap of the group of wires is not readily discernible from other turns or wraps of the wires and the individual electrically conductive wires 36 may appear to be relatively randomly positioned or positioned in a non-uniform array. End plates 78 (only one of which is shown in FIG. 7) may also be mounted to fully assemble fixture 70.

As the inserts 76 are slid towards the core 71, the individual wires 36 may move to fill relatively tightly the space between the core and the insert. This movement may result in a significant number of openings or gaps between adjacent turns of the group of wires being filled due to the lateral movement of the electrically conductive wires 36. In addition, uniform voids between the wires 36 may also be reduced or generally eliminated along a cross-section of each coil 35. This structure creates a relatively dense coil configuration (i.e., a reduced amount of air) which results in more efficient operation of the switched reluctance motor 15.

After the inserts 76 have been positioned on the fixture 70, any necessary operations may be performed to permit or cause the bonding material to set or harden. For example, if the bonding material is a heat set epoxy, the fixture 70 with the plurality of electrically conductive wires 36 mounted thereon may be placed in an oven to cure the epoxy. Upon setting or hardening of the bonding material, the wires 36 will be secured or retained in their desired positions and/or with the coil having the desired shape. In addition, the insulating wrap 49 is secured to or becomes integral with the coil 35 and wrapped around all or most of the major sections 42 of the coil. During the manufacturing process, insulating wrap 49 provides a buffer or barrier between the bonding material applied to the wires 36 and portions of the fixture 70.

After the bonding material is set, the first flange plate 72, the inserts 76, and the end plates 78 may be removed from the fixture 70. The push plate 75 may then be pushed away from the second flange plate 74 as depicted in FIG. 6 to force the fully formed coil 35 away from the second flange plate 74 and off of the core 71.

The stator 16 may be formed by stacking a plurality of one-piece continuous annular iron members (not shown) together. A layer of insulative material (not shown) may be provided between each iron member. Referring to FIG. 9, the coils 35 may be mounted on the stator 66 by moving the coils along arrow "A" relative to the stator to slide a stator pole 68 through the central opening 37 of each coil 35. While sliding the coils 35 onto each stator pole 18, the angle 48 permits the insertion end 38 of each coil 35 to be inserted onto a stator pole 68 without engaging or contacting an adjacent coil that is mounted on an adjacent stator pole. In other words, the angle 48 creates a clearance or opening 80 for the first leg section 44 of an adjacent coil 35 to pass through. Such a configuration of the first leg section 44 and the second leg section 45 permits efficient use of the space along the stator 66 and the use of the bonding material simplifies the handling and installation of the coils 35 on the stator poles 68.

In addition, the openings 80 between the second leg sections 45 of adjacent coils 35 create a first channel between adjacent coils and the openings 81 between the first leg sections 44 of adjacent coils 35 create a second channel between adjacent coils. In some instances, oil, air, or another cooling fluid or medium may be routed through the channels between the first leg sections 44 of adjacent coils 35 and the channels between the second leg sections 45 of the adjacent coils to enhance cooling within the switched reluctance motor 15.

Still further, by positioning the insulating wrap 49 on the major sections of the coil 35, an insulating layer is provided between the stator 16 and the coil.

After each of the coils 35 is mounted on the stator poles 68, retention structures (not shown) may be applied to secure the coils in place. The coils may be electrically connected and further processing, such as vacuum pressure impregnation, of the switched reluctance motor 15 performed as desired.

The shape of the outer surface 41 of the coil 35 may be configured to maximize the amount of copper fill in the stator 66. Accordingly, the outer surface 41 is depicted in the drawings with generally planar surfaces (first leg section 44 and second leg section 45) at an angle to each other. However, the coils 35 may be formed with the outer surface 41 having arcuate surfaces provided that they do not interfere with an adjacent coil as the coils are being mounted on the stator poles. For example, one or both of the first and second leg sections may be formed with arcuate outer surfaces or the entire outer surface 41 may be formed with a continuous arcuate surface so the first and second leg sections are continuous. Such structures may reduce the number or volume of electrically conductive wires 36 but still facilitate acceptable performance and gain the advantage of the simplified handling and installation process described herein.

INDUSTRIAL APPLICABILITY

The industrial applicability of the rotary electric machine described herein will be readily appreciated from the foregoing discussion. The foregoing discussion is applicable to rotary electric machines such as switched reluctance motors 15 in which it is desirable to increase the electrical efficiency and performance of the rotary electric machine over a range of operating conditions and simplify the manufacturing process thereof.

Through the disclosed coil 35 configuration and the method of fabricating the coil, improved electrical performance, efficiency and decreased copper losses may be achieved. For example, the switched reluctance motor 15 using the coil 35 depicted herein may significantly reduce copper losses in the motor by reducing skin effects of the conductors and eddy currents within the conductors. Still further, the higher density of copper within the coil 35 also may improve the thermal conductivity by reducing the air gaps between the individual electrically conductive wires 36 of the group of wires. An additional benefit of reducing air voids between the wires 36 is a decrease in the susceptibility of partial discharge induced failures.

Proximity effects are also reduced through the disclosed structure by the relatively random positioning of the individual electrically conductive wires 36 within the group of wires. This is in part due to the relatively loose twist of the wires and the lateral movement of the wires as they are positioned during engagement of the inserts 76 with the outer surface of the coil after the wires are initially wound around the core 71. Inter-strand circulation currents are reduced by the disclosed structure due to the relatively random positioning of the individual electrically conductive wires 36 of the group of wires within the coil 35. The relatively loose twisting of the electrically conductive wires 36 within the group of wires also results in efficient volume utilization or packing of the wires within the coil 35 upon engagement of the wires by the inserts 76.

In addition, the structure of the coil 35 also improves the manufacturing process of the switched reluctance motor 15 by simplifying the process of mounting the coils on the stator poles 18. More specifically, the compound outer surfaces 41 of each coil 35 create a clearance that permits the passage of the insertion end 38 of a coil without contacting adjacent coils that have previously been mounted on the stator 16. The shape of the outer surface may be based upon the number of stator poles 18 of the stator 16. Still further, by forming each of the coils 35 with a consistent shape, the consistency of the electrical performance of the coils may be increased. By reducing inductance differences between coils 35, current balance between coils may be improved and inter-coil circulation currents further reduced.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A rotary electric machine comprising:
a stator having stator body with an open slot configuration, the stator body having a plurality of stator poles extending away from the stator body to define a plurality of stator slots, each stator slot being positioned between a pair of the plurality of stator poles;
a rotor positioned within the stator and having a plurality of rotor poles;
a plurality of coils, a coil being positioned about each stator pole, each coil having a plurality of electrically conductive wires defining a group of wires, the group of wires being wrapped around its respective stator pole to define a plurality of turns of the group of wires about the stator pole, each coil having a pair of major sections and a pair of minor sections, each minor section interconnecting the pair of major sections, and each major section being positioned adjacent a major section of an adjacent coil, the coil further including an inner surface in proximity to its respective stator pole, a compound outer surface along the pair of major sections, an insertion end positioned generally adjacent the stator body, and a rotor end positioned opposite the insertion end, the insertion end and the rotor end interconnecting the inner surface to the compound outer surface, the compound outer surface has a first leg section and a second leg section, the first leg section extending generally from the insertion end towards the rotor end and the second leg section extending from the rotor end generally towards the first leg section, the first leg section and the second leg section being at an angle to each other; and
a bonding material along portions of the pair of major sections of each coil to define the compound outer surface of the coil.

2. The rotary electric machine of claim 1, wherein the first leg section and the second leg section of each coil are each generally planar.

3. The rotary electric machine of claim 1, wherein the compound outer surface of each coil has a height and the first leg section and the second leg section of each coil intersect at a location between approximately 44% and 64% of the height of the compound outer surface from the insertion end.

4. The rotary electric machine of claim 1, wherein the compound outer surface of each coil has a height and the first leg section and the second leg section of each coil intersect at a location between approximately 49% and 59% of the height of the compound outer surface from the insertion end.

5. The rotary electric machine of claim 1, wherein the compound outer surface of each coil has a height and the first leg section and the second leg section of each coil intersect at a location approximately 54% of the height of the compound outer surface from the insertion end.

6. The rotary electric machine of claim 1, wherein the angle between the first leg section and the second leg section of each coil is between approximately 15 degrees and 60 degrees.

7. The rotary electric machine of claim 1, wherein portions of the plurality of electrically conductive wires of each coil are secured together with the bonding material to maintain the portions of the plurality of electrically conductive wires along the compound outer surface of the respective coil.

8. The rotary electric machine of claim 1, wherein the group of wires of each coil is twisted in a generally uniform manner along an entire length of each turn.

9. The rotary electric machine of claim 1, wherein the group of wires of each coil is twisted at least along the pair of major sections of the coil.

10. The rotary electric machine of claim 1, wherein each stator pole has a generally constant width in a circumferential direction.

11. The rotary electric machine of claim 1, wherein each coil generally eliminates uniform voids between adjacent turns of the group of wires along a cross-section of the respective coil.

12. The rotary electric machine of claim 1, wherein the angle between the first leg section and the second leg section is dependent upon a number of stator poles of the stator.

13. The rotary electric machine of claim 1, wherein the angle between the first leg section and the second leg section is approximately equal to 360 degrees divided by a number of stator poles of the stator.

14. A method of fabricating a coil for a rotary electric machine, comprising:
providing a fixture having a core;
supplying a plurality of electrically conductive wires to define a group of wires;

wrapping the group of wires a predetermined number of turns around the core of the fixture to form a coil having a pair of major sections and a pair of minor sections, each minor section interconnecting the pair of major sections, the coil further including an inner surface, an outer surface, an insertion end, and a rotor end positioned opposite the insertion end, the insertion end and the rotor end interconnecting the inner surface to the outer surface, each of the plurality of electrically conductive wires of each turn being laterally movable relative to others of the plurality of electrically conductive wires of the turn along at least a portion thereof;

moving an insert along the outer surface of the pair of major sections to laterally move at least some of the plurality of electrically conductive wires of each turn to reduce uniform voids between the plurality of electrically conductive wires and to form a compound outer surface along the pair of major sections, the compound outer surface having a first leg section and a second leg section, the first leg section extending generally from the insertion end towards the rotor end and the second leg section extending from the rotor end generally towards the first leg section, the first leg section and the second leg section being at an angle to each other; and applying a bonding material along portions of the pair of major sections to define the compound outer surface.

15. The method of claim 14, wherein the applying step includes applying the bonding material to the plurality of electrically conductive wires before completing the wrapping step.

16. The method of claim 14, wherein the applying step includes applying the bonding material to the pair of major sections after completing the wrapping step.

17. The method of claim 14, further including forming the compound outer surface with the first leg section and the second leg section each being generally planar.

18. The method of claim 14, wherein the compound outer surface has a height and further including forming the compound outer surface with the first leg section and the second leg section intersecting at a location between approximately 49% and 59% of the height of the compound outer surface from the insertion end.

19. The method of claim 14, further including forming the compound outer surface with the first leg section and the second leg section being at an angle of between approximately 15 degrees and 60 degrees.

* * * * *